(12) United States Patent
Wolf et al.

(10) Patent No.: US 9,103,411 B2
(45) Date of Patent: Aug. 11, 2015

(54) BELT TENSIONER

(71) Applicant: Schaeffler Technologies GmbH & Co. KG, Herzogenaurach (DE)

(72) Inventors: Benjamin Wolf, Bubenreuth (DE); Roland Arneth, Eggolsheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/202,423

(22) Filed: Mar. 10, 2014

(65) Prior Publication Data
US 2014/0256488 A1  Sep. 11, 2014

(30) Foreign Application Priority Data
Mar. 8, 2013 (DE) .......................... 10 2013 203 957

(51) Int. Cl.
*F16H 7/12* (2006.01)
*F02B 67/06* (2006.01)
*F16H 7/08* (2006.01)

(52) U.S. Cl.
CPC *F16H 7/12* (2013.01); *F02B 67/06* (2013.01); *F16H 7/1281* (2013.01); *F16H 2007/0806* (2013.01); *F16H 2007/0874* (2013.01); *F16H 2007/0893* (2013.01)

(58) Field of Classification Search
CPC ............ F16H 2007/081; F16H 7/1281; F16H 7/1218; F16H 2007/0806; F16H 2007/0893
USPC ................................. 474/135, 137
See application file for complete search history.

(56) References Cited

U.S. PATENT DOCUMENTS

| | | | | | |
|---|---|---|---|---|---|
| 1,557,486 | A | * | 10/1925 | Valentine | 474/135 |
| 3,473,399 | A | * | 10/1969 | Buchwald | 474/87 |
| 3,888,217 | A | * | 6/1975 | Hisserich | 123/90.31 |
| 4,351,636 | A | * | 9/1982 | Hager | 474/135 |
| 4,758,208 | A | * | 7/1988 | Bartos et al. | 474/135 |
| 5,045,029 | A | * | 9/1991 | Dec et al. | 474/112 |
| 5,045,031 | A | * | 9/1991 | Thomey | 474/138 |
| 5,377,796 | A | * | 1/1995 | Friedmann et al. | 192/3.29 |
| 6,648,783 | B1 | * | 11/2003 | Bogner | 474/134 |
| 7,468,013 | B2 | * | 12/2008 | Di Giacomo et al. | 474/134 |
| 7,494,434 | B2 | * | 2/2009 | Mc Vicar et al. | 474/109 |
| 7,682,272 | B2 | * | 3/2010 | Park | 474/137 |
| 7,824,286 | B2 | * | 11/2010 | Schmid et al. | 474/138 |
| 7,892,125 | B2 | * | 2/2011 | Nelson et al. | 474/134 |

(Continued)

FOREIGN PATENT DOCUMENTS

| | | |
|---|---|---|
| DE | 102011082764 | 4/2012 |
| DE | 102011084680 | 11/2012 |

*Primary Examiner* — Henry Liu
(74) *Attorney, Agent, or Firm* — Volpe and Koenig, P.C.

(57) ABSTRACT

A belt tensioner for attaching to a generator of an auxiliary unit drive of an internal combustion engine, including a tensioner housing mounted on the generator having a cavity, two tensioning rollers which act with a pretensioning force on the belt in a direction of revolution upstream and downstream of the pulley of the generator, a bow spring which produces the pretensioning force accommodated in the cavity, a circular-arc-shaped tensioning lever mounted in the cavity movable in a plane of the circular arc and which is acted on by the force of the bow springs and supports one of the tensioning rollers, and a sliding bearing for the tensioning lever, which sliding bearing extends at the inlet of the cavity. The tensioning lever has a steel core with an aluminum sheath which completely encloses the part of the steel core which extends outside the cavity and inside the sliding bearing.

4 Claims, 2 Drawing Sheets

(56) References Cited

U.S. PATENT DOCUMENTS

| | | | |
|---|---|---|---|
| 8,002,657 B2* | 8/2011 | Antchak et al. | 474/133 |
| 8,602,930 B2* | 12/2013 | Deneszczuk et al. | 474/135 |
| 8,821,328 B2* | 9/2014 | Jud et al. | 474/134 |
| 8,968,128 B2* | 3/2015 | Wolf et al. | 474/135 |
| 2002/0039944 A1* | 4/2002 | Ali et al. | 474/135 |
| 2002/0086751 A1* | 7/2002 | Bogner et al. | 474/134 |
| 2006/0100051 A1* | 5/2006 | Di Giacomo et al. | 474/170 |
| 2006/0217222 A1* | 9/2006 | Lolli et al. | 474/134 |
| 2007/0037648 A1* | 2/2007 | Di Giacomo et al. | 474/134 |
| 2008/0220919 A1* | 9/2008 | Antchak et al. | 474/135 |
| 2009/0215564 A1* | 8/2009 | Pflug et al. | 474/135 |
| 2009/0275432 A1* | 11/2009 | Dell | 474/135 |
| 2009/0298631 A1* | 12/2009 | Jud et al. | 474/237 |
| 2010/0022340 A1* | 1/2010 | Schmidl et al. | 474/135 |
| 2010/0331127 A1* | 12/2010 | Dec et al. | 474/135 |
| 2011/0070985 A1* | 3/2011 | Deneszczuk et al. | 474/135 |
| 2011/0070986 A1* | 3/2011 | Maguire et al. | 474/135 |
| 2012/0004059 A1* | 1/2012 | Ma et al. | 474/135 |
| 2013/0040770 A1* | 2/2013 | Wolf et al. | 474/134 |
| 2013/0079185 A1* | 3/2013 | Schauerte et al. | 474/135 |
| 2013/0095967 A1* | 4/2013 | Wolf et al. | 474/135 |
| 2013/0203535 A1* | 8/2013 | Mack et al. | 474/134 |

* cited by examiner

BELT TENSIONER

INCORPORATION BY REFERENCE

The following documents are incorporated herein by reference as if fully set forth: German Patent Application No.: DE 102013203957.3, filed Mar. 8, 2013.

BACKGROUND

The invention relates to a belt tensioner for attaching to a generator of an auxiliary unit drive of an internal combustion engine, comprising: a tensioner housing which is mounted on the generator and has a cavity, two tensioning rollers which act with a pretensioning force on the belt in its direction of revolution upstream and downstream of the belt pulley of the generator, a bow spring which produces the pretensioning force and is accommodated in the cavity, a circular-arc-shaped tensioning lever which is mounted in the cavity so as to be movable in the plane of the circular arc and which, on the one hand, is acted on by the force of the bow spring and, on the other hand, supports one of the tensioning rollers, and a sliding bearing for the tensioning lever, which sliding bearing extends at the inlet of the cavity.

Such a belt tensioner is known from DE 10 2011 082 764 A1 and DE 10 2011 084 680 B3. The belt tensioner is intended for mounting on a starter generator arranged in the auxiliary unit drive of an internal combustion engine. With its belt pulley which alternately takes up and delivers torque, i.e. in the generator mode or in the starting mode of the internal combustion engine, this tensioner brings about a corresponding change of tensioned strand and slack strand of the revolving belt. Therefore, the tensioning of the slack strand requires a belt tensioner with two tensioning rollers which pretension the belt upstream and downstream of the belt pulley. The two tensioning rollers of the belt tensioner are mounted, on the one hand, on a circular-arc-shaped tensioning lever and, on the other hand, on a tensioner housing which has a cavity, in which the tensioning lever is mounted, containing the bow spring clamped therein between the tensioning lever and the tensioner housing.

SUMMARY

Taking this as the starting point, the object on which the present invention is based is to structurally improve a belt tensioner of the type mentioned at the outset.

This objective is met with a tensioner having one or more features of the invention. Accordingly, the tensioning lever is intended to have a steel core with an aluminum sheath which completely encloses the part of the steel core which extends outside the cavity and inside the sliding bearing. Whereas the steel core provides the requirement for the necessary lever strength with respect to bending and torsion, the sheathing of the steel core with aluminum ensures sufficient corrosion protection of the lever part which, on the one hand, extends outside the cavity and is exposed to environmental influences and, on the other hand, frictionally engages in the sliding bearing.

In terms of its producibility, the bimetallic tensioning lever is preferably an aluminum die-cast part with a steel core.

As an alternative to aluminum, other materials which act both as a protective surface coating and in a reinforcing manner are conceivable. Alternative materials may be other lightweight metals or else plastic.

BRIEF DESCRIPTION OF THE DRAWINGS

Further features of the invention will emerge from the following description and from the drawings which show a belt tensioner according to the invention. In the drawings.

DETAILED DESCRIPTION OF THE PREFERRED EMBODIMENTS

Figure 1:
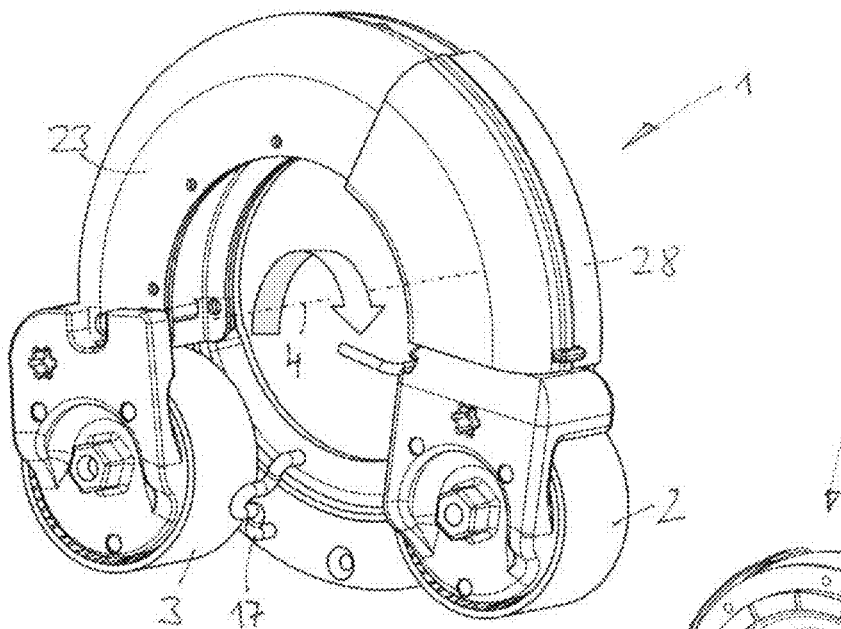
FIG. 1 shows the belt tensioner in a perspective front view.
Figure 2:
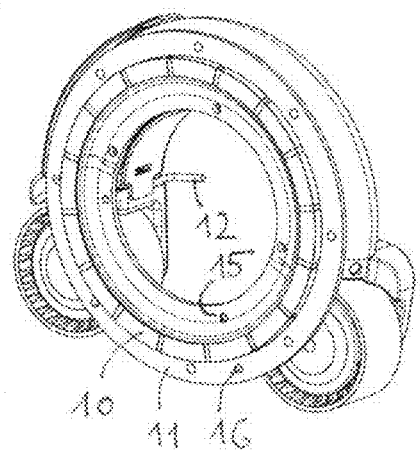
FIG. 2 shows the belt tensioner in a perspective rear view.

The figures show a belt tensioner 1 for frontal attachment to a starter generator (not shown) of an auxiliary unit drive of an internal combustion engine. The belt tensioner comprises two tensioning rollers 2 and 3 which, in the direction of revolution of the belt shown, are arranged upstream and downstream of the belt pulley, which rotates about the generator axis 4, of the starter generator and alternately apply pretensioning force to the momentary slack strand of the belt. The pretensioning force is produced by a bow spring which is formed from two circular-arc-shaped helical compression springs 5 and 6 connected in series. The two springs are clamped between an annular tensioner housing 7 and a spring seat 8 on a circular-arc-shaped tensioning lever 9, with the result that the two tensioning rollers are forced toward one another. One tensioning roller 2 is mounted on the side of the tensioning lever opposite to the spring seat, and the other tensioning roller 3 is mounted fixedly on the tensioner housing.

The annular tensioner housing 7 is mounted on a front end face of the starter generator so as to be rotatable concentrically to the generator axis 4. This makes it possible for the tensioner housing to pivot with the tensioning rollers 2, 3 about the generator axis during a change of mode of the starter generator and a corresponding change of tensioned strand and slack strand in the belt. If thus, for example, the starter generator changes from starter mode into the generator mode, then the belt strand on the side of the one tensioning roller 2 changes from the slack strand to the tensioned strand and on the side of the other tensioning roller 3 from the tensioned strand to the slack strand. Therefore, this change of mode leads to a pivoting of the tensioner housing out of the then current tensioned strand on the side of the one tensioning roller into the then current slack strand on the side of the other tensioning roller, i.e. to a pivoting in the counterclockwise direction in the direction of revolution of the belt shown in FIG. 1. Here, the pretensioning force in the belt is always maintained by the helical compression springs 5, 6 which, from the tensioner housing, apply compressive force to the tensioning lever 9.

This operation of the belt tensioner 1, i.e. the tensioning pivoting into the respectively current slack strand, also produces a so-called decoupling of the rotating starter generator mass from the crankshaft of the internal combustion engine. This decoupling is usually performed by a decoupler on the generator (for example a generator freewheel) or on the crankshaft which, in conventional generator machines without a starter mode, is arranged on the generator shaft or on the crankshaft and decouples the comparatively inert rotating generator mass from the crankshaft when its rotational speed gradient is negative. This means that the belt tensioner according to the invention can also be used in conventional generator belt drives (without starter mode) as an alternative to or in an assisting manner to the decoupler.

The rotational mounting, which supports axial and radial forces and damps torsional vibrations, of the tensioner housing 7 is effected via a sliding bearing ring 10 which abuts, on the one hand, on the end face of the starter generator and, on the other hand, on an annular flange 11 which is screwed to the starter generator, is held rotatably with respect to the tensioner housing and supports the tensioner housing rotatably on the starter generator.

The figures show the belt tensioner 1 in the completely locked, i.e. doubly locked, state. The tensioning lever 9 is virtually completely retracted in the tensioner housing 7 and locked in this position. The mutual spacing of the two tensioning rollers 2, 3 here is large enough that an unimpeded mounting of the belt in the belt drive is possible. The tensioner housing is locked relative to the annular flange 11 fixed on the generator. The locking of the tensioning lever relative to the tensioner housing is effected by means of a locking pin 12 which, on the side of the tensioning lever, is inserted into a cutout 13 (see FIG. 3 without locking pin) and, on the side of the tensioner housing, in a hole 14 aligned with the cutout. The second locking of the tensioner housing with the annular flange comprises two axially offset holes 15 in the tensioner housing and 16 in the annular flange and a securing clasp 17 inserted therein. For service purposes (for example when changing the belt), rotating the tensioning lever and the tensioner housing into the locking positions can be achieved by means of standard tools. For this purpose, the bearing plates 18 and 19 of the tensioning rollers are in each case provided with an internal Torx 20 and a hexagon 21.

Figure 3:
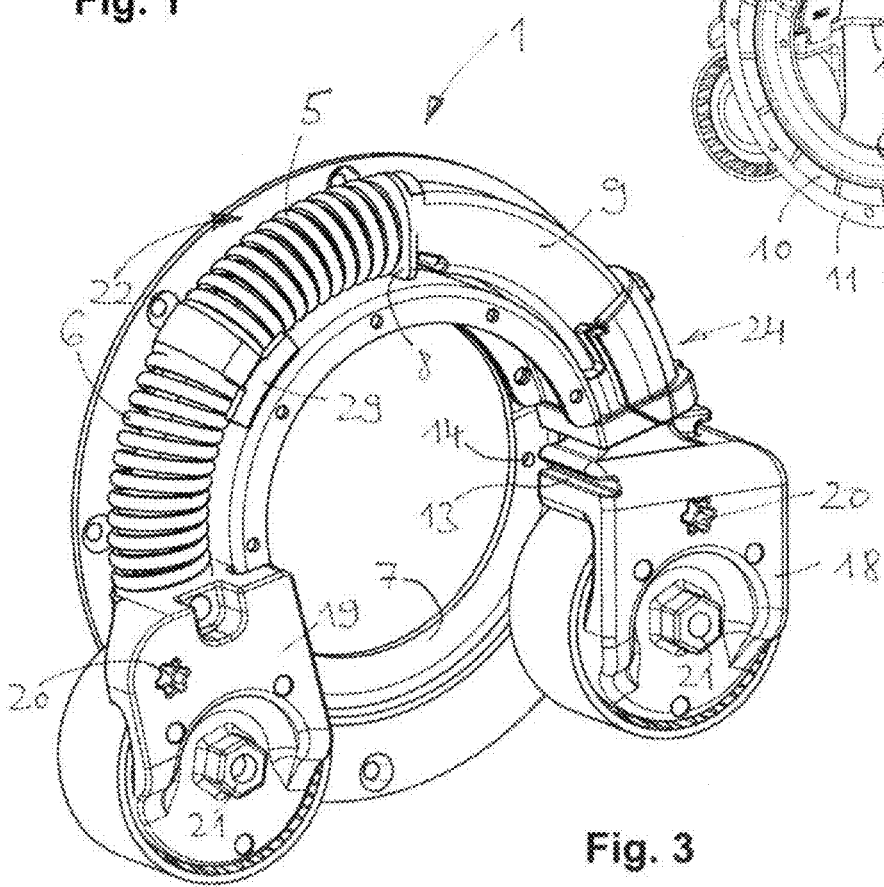
FIG. 3 shows the belt tensioner with the tensioner housing represented as opened.
Figure 4:
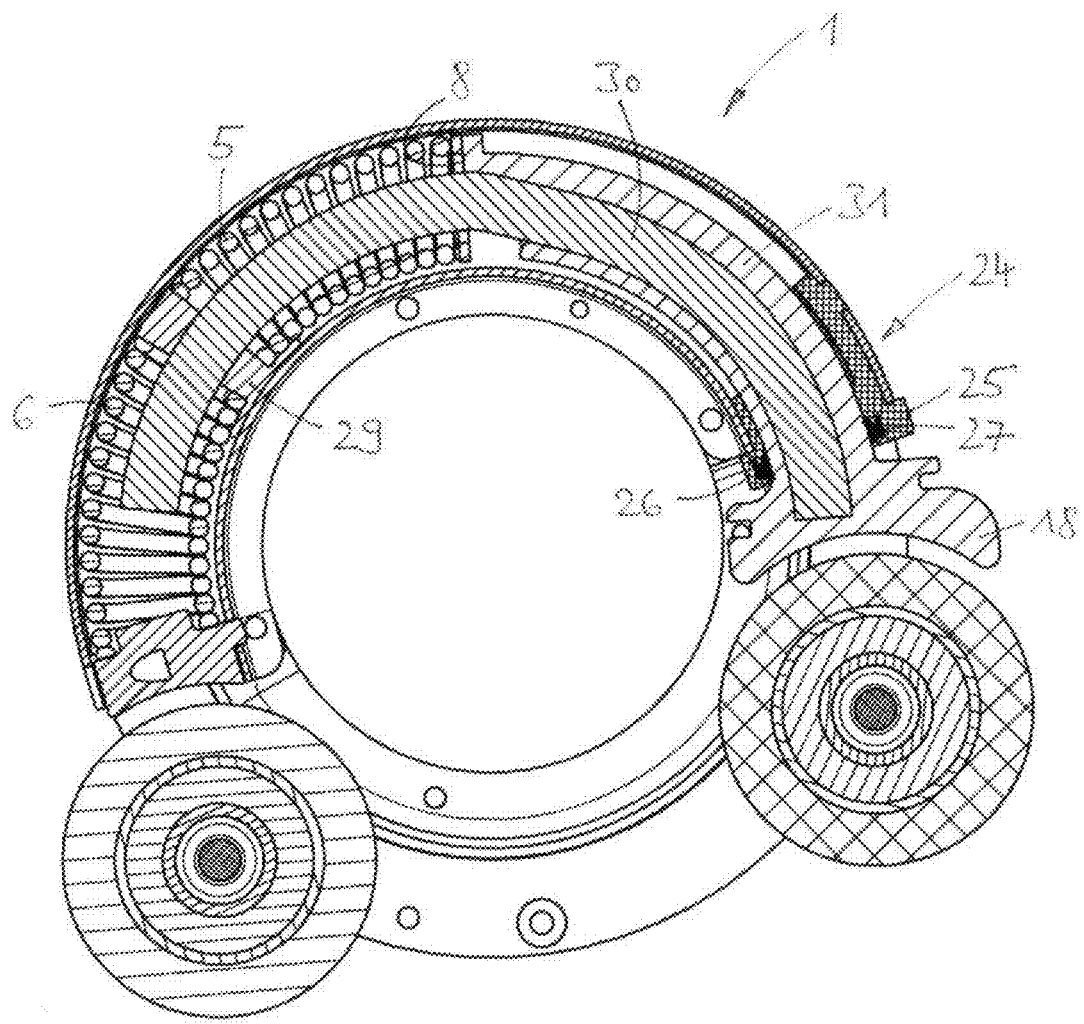
FIG. 4 shows the belt tensioner in longitudinal section.

The tensioner housing 7 has a circular-arc-shaped cavity 22 which is closed by a housing part 23, removed in FIG. 3, and is partly filled with grease. In the cavity, the helical compression springs 5, 6 and the tensioning lever 9 are mounted so as to be movable in the plane of the circular arc. This mounting occurs by means of a sliding bearing 24 fixed on the housing, which sliding bearing is inserted at the inlet of the cavity in the tensioner housing and engages around the tensioning lever. The sliding bearing is formed from two snapped-together bearing shells 25 and 26 into which in each case there is inserted the half of a lip seal 27 which sealingly encloses the tensioning lever. Like the cross section of the tensioning lever, the inner periphery of the seal and of the sliding bearing is substantially rectangular. A plastic shell 28 placed on the housing part serves as a splash guard of the mounting.

An intermediate piece 29 is situated further inwardly in the cavity 22, which intermediate piece is clamped between the mutually facing ends of the helical compression springs 5, 6 and is mounted slidably in the cavity. The intermediate piece, which, like the sliding bearing 24, consists of polyamide with incorporated PTFE, forms a further sliding bearing for the tensioning lever 9. This is an aluminum die-cast part which is reinforced against torsion and bending with a circular-arc-shaped steel core 30 as insert part. Starting from the bearing plate 18, the aluminum sheath 31 extends as far as the helical compression spring 5 and forms the spring seat 8 thereof. Consequently, the aluminum sheath completely encloses the part of the steel core extending outside the cavity and inside the sliding bearing and protects the steel core from corrosion. The aluminum sheath terminates with the spring seat, with the result that the part of the tensioning lever extending further inwardly in the cavity and supported in the further sliding bearing 29 consists only of the exposed and unhardened steel core. However, its surface is protected there against abrasion and corrosion by filling with grease, so that a complicated surface treatment in this region is not required.

LIST OF REFERENCE NUMBERS

1 Belt tensioner
2 One tensioning roller
3 Other tensioning roller
4 Generator axis
5 Helical compression spring
6 Helical compression spring
7 Tensioner housing
8 Spring seat
9 Tensioning lever
10 Sliding bearing ring
11 Annular flange
12 Locking pin
13 Cutout in the tensioning lever
14 Hole
15 Hole
16 Hole
17 Securing clasp
18 Bearing plate
19 Bearing plate
20 Internal Torx
21 Hexagon
22 Cavity
23 Housing part
24 Sliding bearing
25 Bearing shell
26 Bearing shell
27 Seal
28 Plastic shell
29 Intermediate piece/further sliding bearing
30 Steel core
31 Aluminum sheath

The invention claimed is:

1. A tensioner for attaching to a generator of an auxiliary unit drive of an internal combustion engine, comprising:
   a tensioner housing mounted on the generator and having a cavity;
   two tensioning rollers which act with a pretensioning force on a tension element in a direction of revolution upstream and downstream of a pulley of the generator,
   a bow spring which produces the pretensioning force accommodated in the cavity,
   a circular-arc-shaped tensioning lever mounted in the cavity movable in a plane of the circular arc and which is acted on by a force of the bow spring and supports one of the tensioning rollers,
   a sliding bearing for the tensioning lever, the sliding bearing extends at an inlet of the cavity, and
   the tensioning lever has a steel core with an aluminum sheath which completely encloses a part of the steel core which extends outside the cavity and inside the sliding bearing.

2. The belt tensioner as claimed in claim 1, wherein the tensioning lever is an aluminum die-cast part with a steel core.

3. The belt tensioner as claimed in claim 1, wherein the bow spring comprises two circular-arc-shaped helical compression springs connected in series, an intermediate piece mounted slidably in the cavity being clamped as a further sliding bearing for the tensioning lever between the mutually facing spring ends.

4. The belt tensioner as claimed in claim 3, wherein the cavity is closed and filled with grease and the sliding bearing is provided with a seal enclosing the tensioning lever, the intermediate piece supporting the steel core exposed inside the further sliding bearing.

* * * * *